United States Patent [19]

Gerritsen

[11] Patent Number: 5,118,224
[45] Date of Patent: Jun. 2, 1992

[54] MORTAR TRANSPORT APPARATUS

[75] Inventor: Jan W. Gerritsen, Alphen a/d Rijn, Netherlands

[73] Assignee: Bredel Exploitatie B.V., Delden, Netherlands

[21] Appl. No.: 626,742

[22] Filed: Dec. 13, 1990

[51] Int. Cl.$^5$ .............................................. B65G 53/46
[52] U.S. Cl. ........................................ 406/63; 406/67; 406/48
[58] Field of Search ........................ 406/63, 66, 67, 48

[56] References Cited

U.S. PATENT DOCUMENTS

| | | | |
|---|---|---|---|
| 3,076,580 | 2/1963 | Heath | 406/63 |
| 3,096,968 | 7/1963 | Kempthorne | 406/48 X |
| 3,995,777 | 12/1976 | Diez et al. | 406/63 X |
| 4,154,486 | 5/1979 | Nishikawa | 406/63 X |
| 4,376,600 | 3/1983 | Egli | 406/63 |

FOREIGN PATENT DOCUMENTS

| | | | |
|---|---|---|---|
| 2415975 | 10/1975 | Fed. Rep. of Germany | 406/63 |
| 31674 | 9/1964 | German Democratic Rep. | 406/67 |
| 633779 | 12/1949 | United Kingdom | 406/63 |
| 645753 | 11/1950 | United Kingdom | 406/63 |

*Primary Examiner*—Johnny D. Cherry
*Assistant Examiner*—James M. Kannofsky
*Attorney, Agent, or Firm*—Weingarten, Schurgin, Gagnebin & Hayes

[57] ABSTRACT

The invention relates to a mortar transport apparatus, consisting essentially of a rotor comprising cylindrical mortar transport chambers, the rotor being arranged between stationary sealing plates and being adapted to be driven by a motor, a feed hopper arranged above the rotor, the feed hopper being adapted to fill the mortar transport chambers via a filling hole provided in the sealing plate situated above the rotor, a blow-off chamber arranged under the lower sealing plate and adapted to have a transport hose connected to it, the blow-off chamber being adapted to be filled via a mortar discharge opening in the lower sealing plate, a duct for supplying air under pressure terminating in a slit-shaped opening in the upper sealing plate above the mortar transport chamber which communicates with the blow-off chamber for driving out the mortar present in the transport chamber, air being supplied to the blow-off chamber at the location opposite the transport hose connection, for pneumatic transport of the mortar through the transport hose. According to the invention the slit-shaped opening (16) is formed by a series of separate spray openings (31) arranged side by side, and arranged for an adjustable water/air mixture to be supplied to them under pressure. The series of spray openings are arranged in a semi-circular pattern (16), the radius of the pattern being about equal to the radius of the transport chamber (10).

8 Claims, 4 Drawing Sheets

MORTAR TRANSPORT APPARATUS

This invention relates to a mortar transport apparatus for continuously transporting and supplying floor mortar, spray mortar and the like.

For the construction of concrete floors large quantities of floor mortar are required, which have to be transported from the mixing site to the site of use. Mixer-transport apparatuses comprise a transport undercarriage and can be transported as a trailer behind a vehicle. The mixing tank which is part of the apparatus typically has a capacity of 220 l. In one manner or another the mixing tank is filled with sand, cement, and water in the proper proportions, after which these components are mixed and, using a compressor which is part of the apparatus, pneumatically transported via a hose connected to the mixing tank to, for instance, a construction site where cement floors are to be constructed. The floor mortar, therefore, is supplied in charges, the quantities periodically supplied being equal to the volume of the mixing tank of the mixer-transport apparatus.

Besides apparatuses that supply charges of relatively large quantities of a sand/cement water mixture, apparatuses are known for supplying a continuous flow of such a mixture. Such an apparatus is disclosed in CH-A-566,924. This known continuously operating mortar transport apparatus essentially comprises a rotor with cylindrical mortar transport chambers, arranged between stationary sealing plates and adapted to be driven by a motor. Arranged above the rotor is a feed hopper adapted to fill the mortar transport chambers in the rotor one by one via a filling hole provided in the sealing plate disposed above the rotor. Disposed under the lower sealing plate is a blow-off chamber, which has a transport hose connected to it. The blow-off chamber can be filled via a mortar discharge opening in the lower sealing plate, using compressed air which is supplied from above to the mortar transport chamber above the blow-off chamber. The quantity of mortar passed from the transport chamber into the blow-off chamber is transported out of the blow-off chamber and through the transport hose using compressed air which is supplied to the blow-off chamber.

This known mortar transport apparatus is very useful for dry mortar and in order to obtain dry mortar its sand component will have to be dried previously, for instance in a gas furnace. Thus, at the end of the transport hose a dry sand-cement mixture is discharged. For the construction of concrete floors, a water hose can be connected to the spray nozzle at the end of the transport hose for adding the proper amount of water to the dry sand-cement mixture so as to obtain a ready-to-use wet sand-cement mixture.

Practice has shown that it is difficult to ensure that the humid water-sand-cement mixture is properly and constantly mixed when water is added in the vicinity of the spray nozzle at the end of the transport hose.

Owing to the very short mixing time a great deal of dry cement powder is discharged by the spray nozzle and this leads to unhealthy, and hence undesirable, dust formation.

A further problem associated with this known apparatus is obtaining a good sealing between the rotatable rotor and the stationary sealing plates above and under the rotor. These sealing plates are made of rubber and are pressed against the rotor on opposite sides by means of tie rods. Proper sealing requires that the sealing plates press against the rotor firmly. This, however, leads to relatively rapid wear of the rubber sealing plates and, moreover, to the development of a fairly large amount of heat. Processing sand that has not been previously dried with cement yields a somewhat humid mortar, which will gradually clog the mortar transport chambers in the rotor, and the rate of flow supplied by the apparatus decreases substantially.

The invention aims to provide a mortar transport apparatus for continuously supplying floor mortar and the like, in which these drawbacks are removed and which apparatus is particularly suitable for mortar of sand that has not been previously dried.

To that effect the apparatus is characterized according to the invention in that the slit-shaped opening is formed by a series of separate spray openings arranged side by side, to which an adjustable water/air mixture can be supplied under pressure.

Unexpectedly it has turned out that supplying a water/air mixture under pressure to the transport chamber via a series of separate spray openings does not lead to lumps of mixture being transported in the transport hose, but to the formation of a well-mixed water/mortar mixture of substantially constant, homogeneous composition. Supplying the water/air mixture under pressure via a series of spray openings arranged in a circular pattern has a further advantage in that the transport chamber is blown clear completely and no residual mortar remains behind in that chamber, not even if non-previously dried sand is used.

To prevent the formation of lumps in the blow-off chamber, it preferably comprises a converging discharge funnel, the internal cross-sectional area of which is the same at all points as that of the discharge hose, and in the blow-off chamber a slit-shaped air supply opening is provided across the full width of the blow-off chamber.

For sealing the rotor preferably sealing plates are used which are made from texturized steel plates of a hardness of at least 75 Rockwell. The term "texturized" steel plates is here intended to refer to plates into which ceramic particles are incorporated, which form a wearing layer. The plates are harder than sand, exhibit substantially no wear and therefore have a long life. The sealing plates may be made very smooth, produce considerably less friction than the rubber sealing plates previously used and permit a substantial increase of the working pressure.

One embodiment of the apparatus according to the invention will hereinbelow be further explained and illustrated, by way of example, with reference to the accompanying drawings, in which.

Figure 1A:
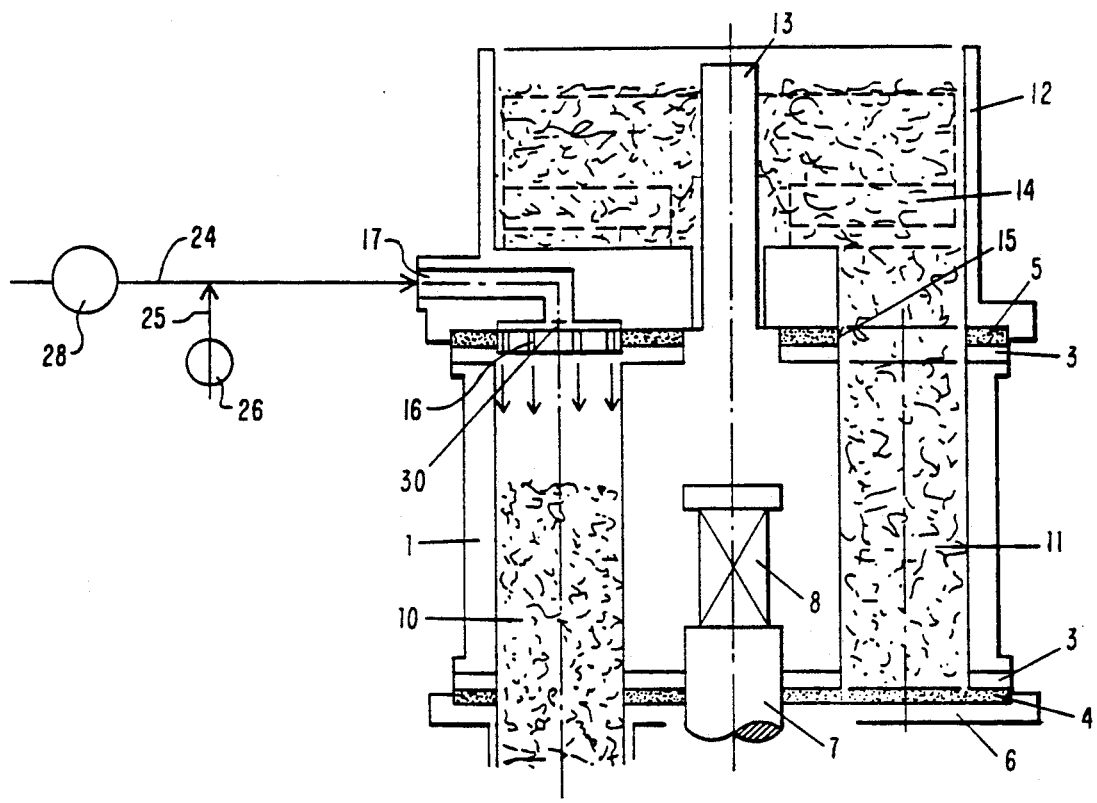
FIGS. 1A through 1C shows a schematic cross-section of the apparatus according to the invention.
Figure 1B:
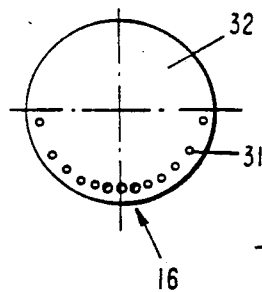

The mortar transport apparatus comprises a rotor 1, which comprises a series of cylindrical mortar transport chambers 2 whose axes are parallel to the axis of the rotor 1 and which are arranged on one and the same pitch circle. The mortar transport chambers 2 have a large diameter relative to the axial measurement of the rotor 1, preferably of 100 mm. This facilitates filling when humid sand is used. Arranged at the top and bottom surface of the rotor 1 are smooth wearing plates 3, which are securely attached to the rotor 1 and, as will be clear, have a pattern of holes in register with the cylinders 2 in the rotor 1. The rotor 1 is supported by a frame 6—FIG. 1A showing only the upper portion—with a lower sealing plate 4 interposed between them, the plate 4 being connected to frame 6 so as to be fixed at least in the direction of rotation. The rotor 1 is driven by means of a motor shaft 7, which is connected to the rotor 1 by means of a suitable coupling 8.

Arranged at the top of the rotor 1 is a feeding hopper 12 with an upper sealing plate 5 being interposed, the plate 5 being connected to the feed hopper 12 so as to be fixed at least in the direction of rotation. Arranged at the top of the rotor 1 is a shaft stub 13 extending into the space of the feed hopper 12 and having connected to it agitating gear 14 (indicated in FIG. 1A by broken lines).

The wearing plates 3 and the sealing plates 4, 5 are steel plates, provided on both sides with a ceramic wear layer.

Of the mortar transport cylinders, the cylinder 11 is in the filling position, and the cylinder 10, situated substantially diametrically opposite, is in the discharge position. Above the cylinder 11 in the sealing plate 5 a slotted opening 15 is provided which extends across one or more cylinders 11. In the filling position mortar of humid sand can thus pass down from the feed hopper 12 into the cylinder 11 and, after displacement of the cylinder 11 in circumferential direction, a next cylinder is filled.

Figure 3:
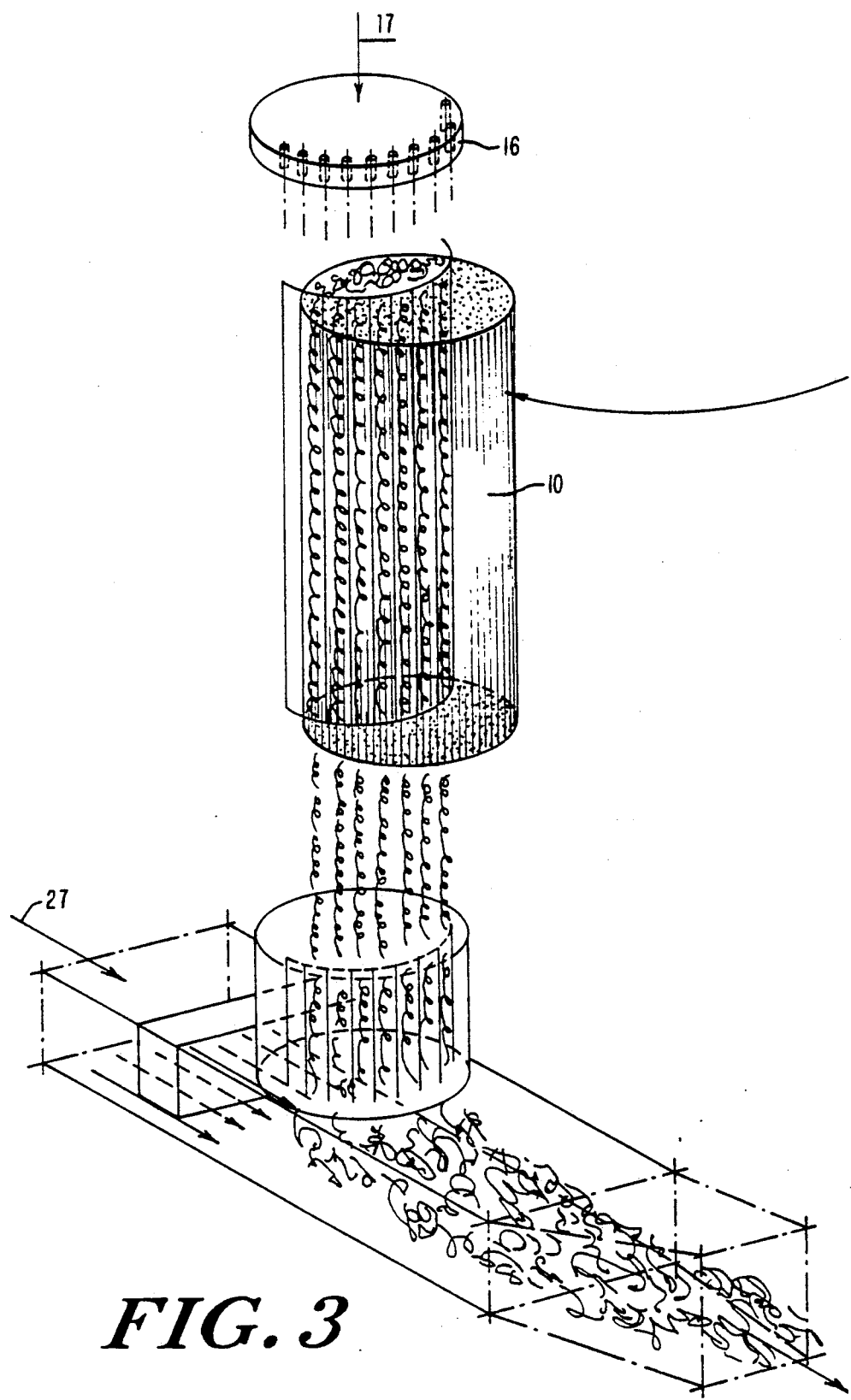
FIG. 3 shows a perspective view of a mortar transport chamber as shown in FIGS. 1A through 1C being emptied under pressure.

Above the discharge cylinder or transport cylinder 10 a series of spray openings 31 are arranged in the sealing plate 5 in a semi-circular pattern 16. The radius of the pattern 16 is substantially equal to the radius of the cylinder 10. Disposed above the pattern 16 is a chamber 30 having a duct 17 connected to it. Through the duct 17 an adjustable water/air mixture can be supplied under pressure, the mixture being used to spray the contents of the cylinder 10 into the blow-off chamber 18 arranged under the cylinder 10. The diameter and the number of spray openings 31 are so chosen that above the spray openings a gauge pressure of at least 1.5–2 atm is obtained. Such a pressure generates strong jets that spray the discharge cylinder 10 entirely clear, so that no residual mortar will remain behind. As will be clear, above the blow-off chamber 18, in the lower sealing plate 4 a cylindrical opening is provided of the same diameter as the cylinder 10. The contents of the cylinder 10 are discharged more or less layer by layer during the displacement in circumferential direction of the cylinder 10 along and beyond the semi-circular spray opening pattern 16 (see FIG. 3). During the discharge a forced mixing of water and mortar takes place.

The series of spray openings 31 are preferably provided in a separate plate 32 set in the upper sealing plate 5.

It will be clear that when the rotor 1 is driven in the direction of rotation, each cylinder 2 will be filled as soon as it has entered the filling position (cylinder 11), and that the contents will be discharged from this cylinder using a water/air mixture as soon as it has reached the discharge position (cylinder 10).

The blow-off chamber 18 comprises a cylindrical inlet chamber 19 and a blow-off space 20 arranged perpendicularly to it, a transport hose being connectable to the end 21 of the blow-off space 20. The blow-off space 20 essentially comprises a converging discharge funnel whose internal cross-sectional area is at all points the same as that of the connecting end 21 for the transport hose. At the end 22 opposite end 21 of the blow-off apparatus 18, a stub is arranged for connecting duct 27 to it, through which air can be supplied under pressure to the blow-off apparatus. Between the connector branch 22 and the inlet chamber 19 there is a slit-shaped constriction 23. The air streaming through the slit-shaped narrowing 23 causes the mortar to be blown off from the inlet chamber 19 to the end 21 of the blow-off apparatus, and the water/mortar mixture to be further transported and mixed again.

To obtain a well-adjustable water/air mixture in the duct 17, the air is supplied under pressure from a source 28 via a duct 24 connected to the duct 17, a water supply duct 25 with a dosaging member 26 being connected to the duct 24.

The air duct 27 is fed from a separate air source 29 so as to permit the supply of air to the cylinder 10 via the duct 17 and the blow-off chamber 18, respectively, to be controlled independently of each other.

The rotor 1 rotates between the stationary sealing plates 4, 5 which engage under pressure the wearing plates 3 mounted on the top and bottom surface, respectively, of the rotor. Proper sealing of the rotor was achieved by making the sealing plates 4, 5 and the wearing plates 3 from texturized steel plates having a hardness of at least 75 Rockwell.

Figure 1C:
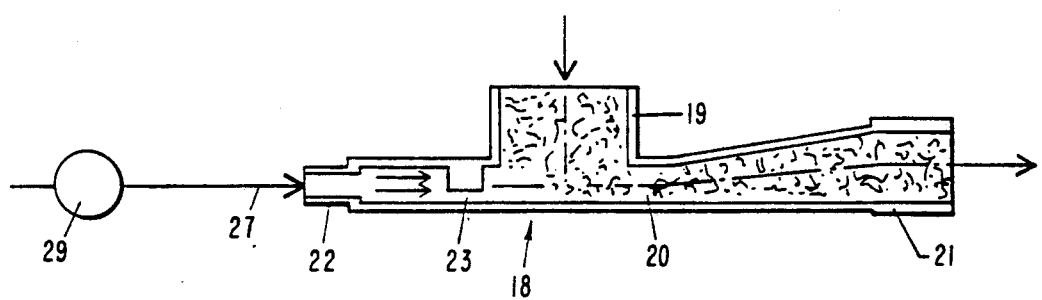
Figure 2:
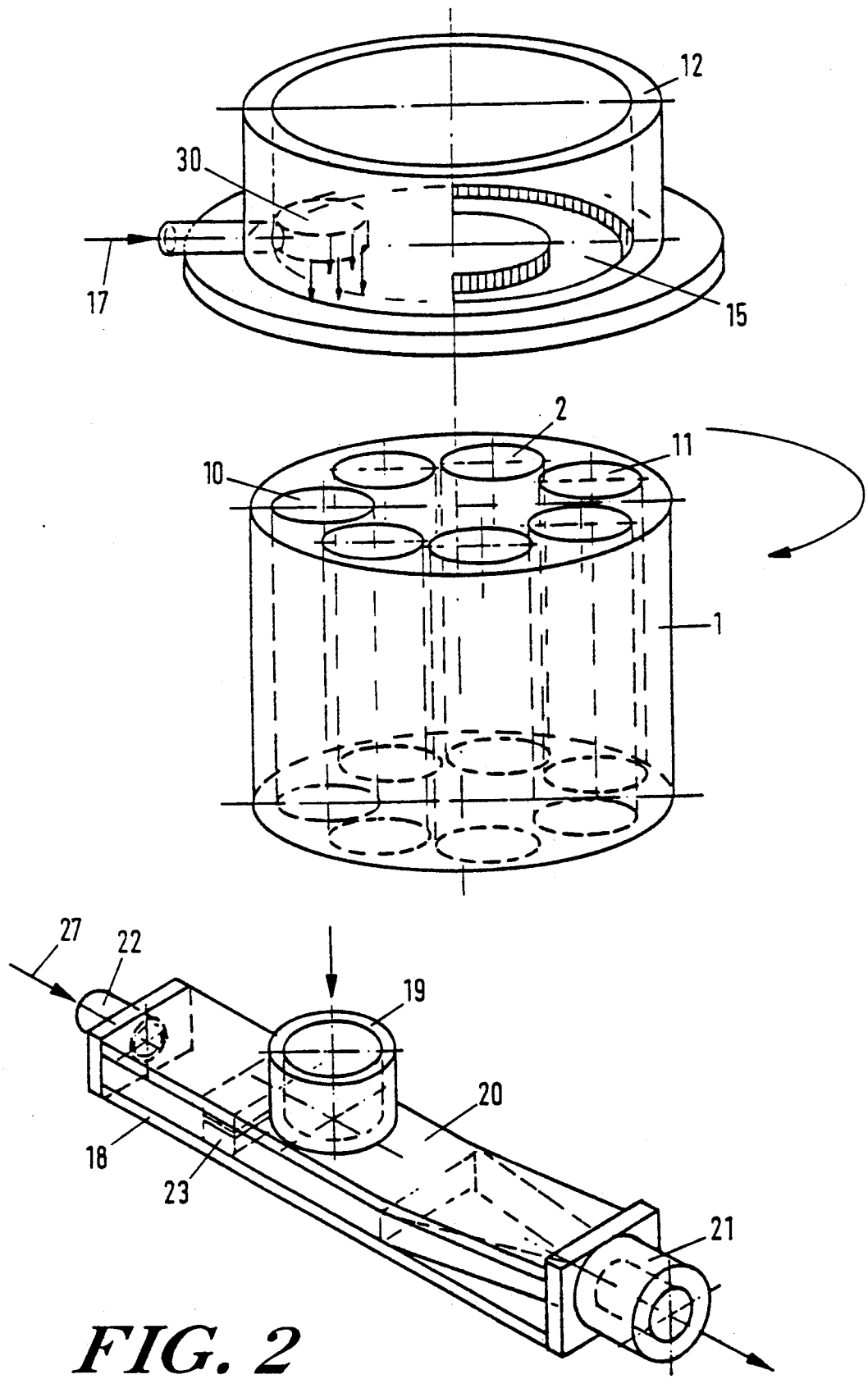
FIG. 2 shows a perspective view of the most important components of the apparatus according to FIGS. 1A through 1C.
Figure 4:
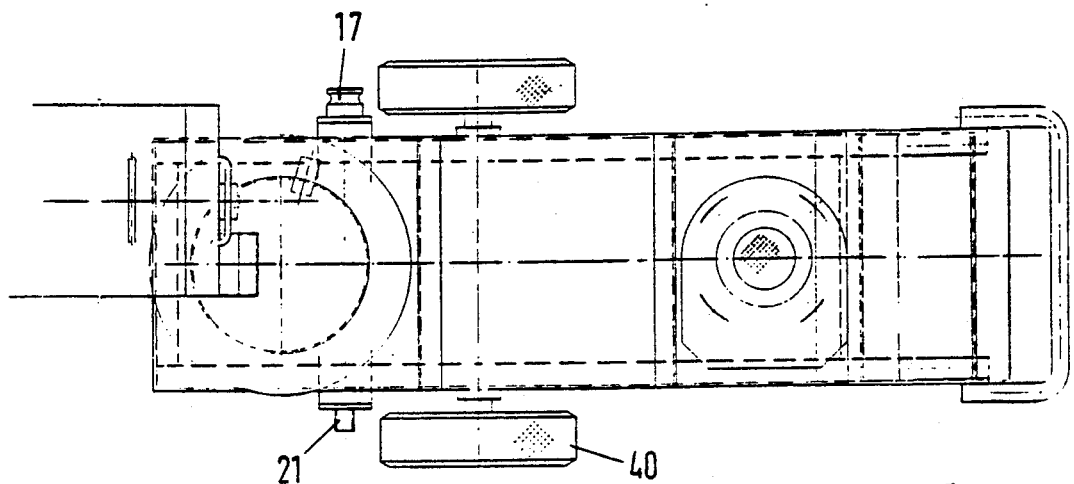
FIGS. 4–5 show a top plan view and a side elevational view, respectively, of a mortar transport apparatus including driving means on a mobile undercarriage.
Figure 5:
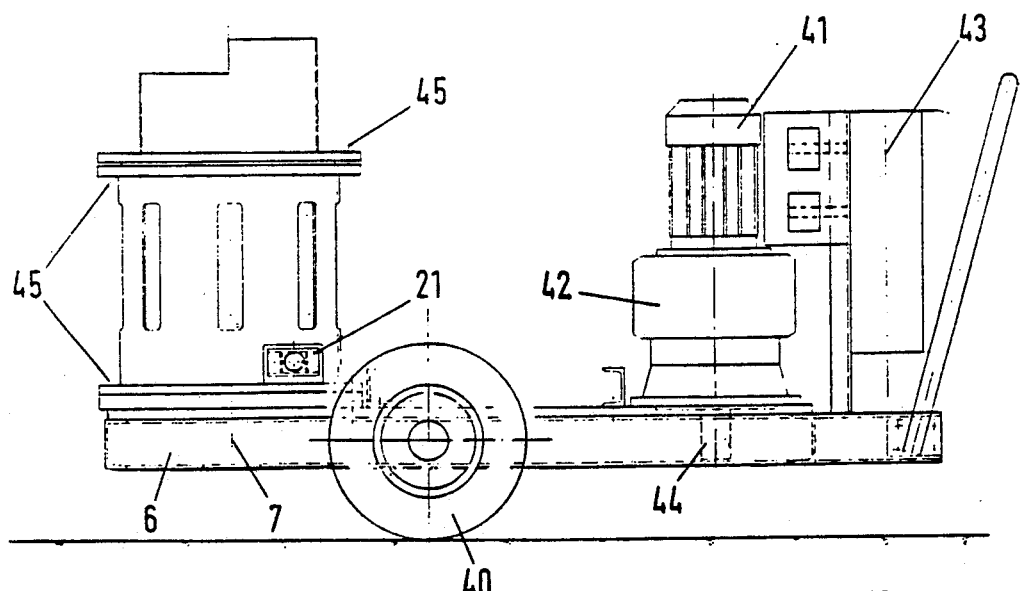

FIGS. 4 and 5 show a mobile mortar transport apparatus comprising a frame 6 supported by wheels 40, a motor 41 with reduction gear 42 and gear case 43 being mounted on the frame 6. The output shaft 44 of driving means 41, 42 is coupled to the shaft 7 of the rotor 1 by means of chains provided in the frame 6. The rotor 1 is securely attached to the frame 6 by means of tie rods 45 (indicated by broken lines). A mortar transport hose can be connected to the end 21 of the blow-off chamber 18 (FIG. 1C). The duct for supplying a water/air mixture above the rotor can be connected to the connector branch 17.

What I claim is:

1. A mortar transport apparatus comprising
   a rotor comprising cylindrical mortar transport chambers, said rotor being arranged between upper and lower stationary sealing plates and being adapted to be driven by a motor,
   a feed hopper arranged above the rotor, said feed hopper being adapted to fill the mortar transport chambers via a filling hole provided in the sealing plate situated above the rotor,
   a blow-off chamber arranged under the lower sealing plate and having a transport hose connection,
   said blow-off chamber being adapted to be filled via a mortar discharge opening in the lower sealing plate,
   a duct for supplying air under pressure terminating in a slit-shaped opening in the upper sealing plate above the mortar transport chamber which communicates with the blow-off chamber for driving out the mortar present in the transport chamber,
   means for supplying air to the blow-off chamber at a location opposite the transport hose connection, for pneumatic transport of the mortar through the transport hose, characterized in that the slit-shaped opening (16) is formed by a series of separate spray openings (31) arranged side by side, and the apparatus further comprising means for supplying an adjustable water/air mixture under pressure to said spray openings.

2. An apparatus according to claim 1, characterized in that the semi-circular spray opening pattern (16) is provided in a separate plate which is set in the upper sealing plate (5).

3. An apparatus according to claim 1, characterized in that the diameter and the number of spray openings (31) are so chosen that above the spray openings a gauge pressure of at least 1.5 atm. is obtained.

4. An apparatus according to claim 1, characterized in that the blow-off chamber (18) comprises a discharge funnel whose internal cross-sectional area is at all points the same as that of the transport hose connection, there being provided in the blow-off chamber (18) a slit-shaped air supply opening (23) across a full width of the blow-off chamber.

5. A mortar transport apparatus according to claim 1, characterized in that the upper and the lower sealing plates (4, 5) are made from texturized steel plate having a hardness of at least 75 Rockwell.

6. A mortar transport apparatus according to claim 1, characterized in that the rotor (1) is provided with top and bottom surfaces having with wearing plates (3) made of texturized steel plate.

7. An apparatus according to claim 1, characterized in that the transport chambers are circular cylindrical and the series of spray openings are arranged in a semi-circular pattern (16) having a radius about equal to a radius of each of the transport chambers (10).

8. An apparatus according to claim 7, characterized in that:
the semi-circular spray opening pattern (16) is provided in a separate plate which is set in the upper sealing plate;
the spray openings have a diameter and are of a number such that above the spray openings a gauge pressure of at least 1.5 atm. is obtained;
the blow-off chamber (18) comprises a discharge funnel whose internal cross-sectional area is at all points the same as that of the transport hose connection, there being provided in the blow-off chamber (18) a slit-shaped air supply opening (23) across a full width of the blow-off chamber;
the upper and the lower sealing plates (4, 5) are made from texturized steel plate having a hardness of at least 75 Rockwell; and
the rotor (1) is provided at its top and bottom surfaces with wearing plates (3) made of texturized steel plate.

* * * * *